Patented Aug. 4, 1942

2,292,332

UNITED STATES PATENT OFFICE 2,292,332

COMPOSITION COMPRISING CELLULOSE DERIVATIVES

Gaetano F. D'Alelio, Pittsfield, Mass., assignor to General Electric Company, a corporation of New York No Drawing. Application November 1, 1940, Serial No. 363,901

14 Claims. (Cl. 106—176)

This invention relates to compositions comprising a cellulose derivative and to articles produced therefrom. More particularly it is concerned with the production of plastic and coating compositions comprising a cellulose derivative, for example cellulose esters, cellulose ethers, cellulose ether-esters, etc., and a plasticizer therefor comprising at least one aryl (mono or poly) sulfonyl morpholine.

In the production of plastic and coating compositions comprising cellulose derivatives it is the usual practice to incorporate into the cellulose derivative or into the plastic or coating composition made therefrom a plasticizer to modify the flexibility and the extensibility of the composition. With the ordinary plasticizers improvements in flow characteristics of the cellulose derivative composition usually are attained with a corresponding sacrifice in the hardness of the product at room temperature. The ideal plasticizer, therefore, is one which increases the toughness and flexibility of the cellulose derivative composition without causing the cellulose derivative to lose much, if any, of its room temperature hardness. Furthermore, the plasticizer should be compatible with the cellulose derivative, should have a low volatility, so that the plasticizer will not volatilize at molding temperature or on aging and should be resistant to discoloration. The plasticized cellulose derivative composition should have high resistance to abrasion and to attack by such agents as oil, grease, acids, alkalies, etc., have a high degree of flexibility in film form at low temperatures, as well as at elevated temperatures, and should not "bleed" plasticizer when the composition is exposed to elevated temperatures. Plasticized cellulose derivative molding compositions should flow well at molding temperatures but harden rapidly upon cooling. The molded compositions should have a high mechanical strength and be highly resistant to sudden shocks or strains.

Another desirable characteristic in a plasticizer for cellulose derivatives is that it function not only as a plasticizer but also as a moisture-proofing agent for, or impart moisture-resisting characteristics to, the cellulose derivative. Otherwise, for many applications of the compositions, it is necessary to incorporate into the composition an additional agent that will render the composition resistant to moisture.

I have discovered that the aryl sulfonyl morpholines constitute a class of materials which meet the above-mentioned requirements for a plasticizer for cellulose derivatives. These morpholines not only effectively plasticize a cellulose derivative but also, although not moisture-resistant in and of themselves, materially improve the moisture resistance of the resulting composition. This was quite surprising and unexpected, since in no way could it have been predicted from the known properties of aryl sulfonyl morpholines or of cellulose derivatives that such morpholines would be compatible with a cellulose derivative and would serve not only effectively to plasticize a cellulose derivative but also to impart water-repellent characteristics thereto.

The term "aryl sulfonyl morpholine" as used herein and in the appended claims has reference to, and includes within its meaning, organic compounds which may be represented by the formula $X-SO_2N(C_2R_4)_2O$, where X represents any aryl radical and R represents hydrogen or any monovalent organic radical. Thus X may be a radical such, for example, as phenyl, halogenoaryl (e. g., halogeno-phenyl), alkylated aryl (e. g. alkylated phenyl), hydroxylated aryl (e. g., hydroxy phenyl), alkoxy aryl (e. g., alkoxy phenyl), aryloxaryl (e. g., phenoxyphenyl), naphthyl, etc.; and R may be either hydrogen or a monovalent organic radical such, for example, as alkyl, aryl, aralkyl, alkaryl, acyl, naphthyl, hydrocyclic, heterocyclic, etc., or nitro, halogeno, aceto, carbalkoxy, acetoxy, etc., derivatives of such radicals. More specific examples of this general class of compounds are benzene sulfonyl morpholine, para-toluene sulfonyl morpholine (para-methylbenzene sulfonyl morpholine), ortho-ethylbenzene sulfonyl morpholine, para-hydroxybenzene sulfonyl morpholine, naphthalene sulfonyl morpholine, 2,4,6-trichlorobenzene sulfonyl morpholine, para-butoxybenzene sulfonyl morpholine and para-(beta acetoxy)ethylbenzene sulfonyl morpholine, wherein by "sulfonyl morpholine" is meant specifically the radical

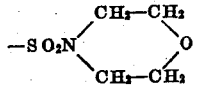

In order that those skilled in the art better may understand how the present invention may be carried into effect the following illustrative examples thereof are given. All parts are by weight.

EXAMPLE 1

Preparation of benzene sulfonyl morpholine

Forty-nine and four-tenths parts of morpholine dissolved with cooling in 50 parts water were added slowly to 50 parts benzene sulfonyl chloride with vigorous shaking and cooling. Crystals began to form almost immediately. The reaction mass was allowed to stand at room temperature for three hours while continuing the stirring. The crystals of benzene sulfonyl morpholine were filtered from the aqueous solution and washed free of morpholine hydrochloride. The filtered crystals were further purified by recrystallizing from a 90% alcohol solution.

*Preparation of coating composition*

A coating composition comprising a cellulose derivative, specifically cellulose acetate, and benzene sulfonyl morpholine was prepared as follows:

| | Parts |
|---|---|
| Cellulose acetate | 10.75 |
| Benzene sulfonyl morpholine | 3.59 |
| Acetone | 64.24 |
| Alcohol, absolute | 10.71 |
| Ethylene glycol monomethyl ether | 10.71 |

The cellulose acetate and benzene sulfonyl morpholine were dissolved in the mixture of acetone, alcohol and ethylene glycol monomethyl ether. The resulting solution was poured upon a glass plate with the aid of a fine screen to act as a distributing medium. The film was air dried for several minutes and then further dried at a temperature of the order of 35° to 40° C. to evaporate the solvent. The dried film was removed from the glass plate. The film was clear, transparent, smooth, had excellent flexibility and mechanical strength, and had good water-resisting characteristics.

EXAMPLE 2

*Preparation of para-toluene sulfonyl morpholine*

Forty-five and six-tenths parts morpholine dissolved with cooling in 50 parts water were caused to react with 50 parts para-toluene sulfonyl chloride as described under Example 1 with reference to the preparation of benzene sulfonyl morpholine. As the crystals of para-toluene sulfonyl morpholine, after recrystallization from 90% alcohol, gave an acid reaction in aqueous solution, they were washed with a 2% caustic soda solution and then several times with water until aqueous solutions thereof tested neutral to litmus.

*Preparation of coating composition*

A coating composition and dried films were prepared as described under Example 1 with the exception that 3.59 parts para-toluene sulfonyl morpholine were used in place of benzene sulfonyl morpholine. The properties of the films were much the same as the films of Example 1.

It will be understood, of course, by those skilled in the art that this invention is not limited to compositions comprising cellulose acetate and an aryl sulfonyl morpholine, and that compositions comprising any cellulose derivative and an aryl sulfonyl morpholine compatible therewith may be prepared in accordance with the present invention. Additional examples of cellulose derivatives are cellulose esters, e. g., cellulose nitrate, butyrate, oleate, stearate, phthalate, naphthenate, laurate, aceto-butyrate, aceto-maleate, aceto-nitrate, etc.; cellulose ethers, e. g., ethyl cellulose, benzyl cellulose, glycol cellulose, etc.; cellulose ether-esters, e. g., ethyl cellulose-nitrate, benzyl cellulose-acetate, ethyl cellulose-acetate, glycol cellulose-acetate, etc.; and similar cellulose derivatives. Cellulose esters and ether-esters of the lower fatty acids, e. g., the acetates, are preferred.

The amount of aryl sulfonyl morpholine which is incorporated into the cellulose derivative may be varied widely, but ordinarily is employed in the approximate ratio of from 5 to 100 or more parts by weight of aryl sulfonyl morpholine for each 100 parts by weight of cellulose derivative. Higher or lower amounts of aryl sulfonyl morpholine may be employed for some applications of the cellulose derivative compositions, but no particular advantages ordinarily accrue when the morpholine derivative constitutes less than 2½ or 3% or substantially exceeding 50% by weight of the combined amount of cellulose derivative and aryl sulfonyl morpholine. Usually with less than 5% of the morpholine derivative the composition tends to have insufficient flexibility and flow characteristics for the usual coating and plastic applications, but may be suitable for other applications of the composition. Above 50% of morpholine derivative the composition tends to lack the room temperature hardness and storage characteristics that are highly desirable. Of course it will be understood that the particular amount of aryl sulfonyl morpholine incorporated into the cellulose derivative is dependent largely upon the particular cellulose derivative and aryl sulfonyl morpholine employed and the particular properties desired in the resulting composition. Ordinarily, in producing molding (moldable) plastics there is used, by weight, from 5 to 40 parts of the morpholine derivative per 100 parts of the cellulose derivative. For the production of films, extrudable flexible tubing, wire coating compositions, lacquer coatings, etc., the composition may contain, by weight, up to 100 or more parts of aryl sulfonyl morpholine per 100 parts of the cellulose derivative.

The cellulose derivative compositions may be prepared with or without the usual solvents or diluents, e. g., alcohol for the cellulose nitrate compositions, toluol-alcohol mixtures for the cellulose ether compositions, ketones, for instance acetone or acetone-containing mixtures, for the cellulose ester compositions, etc.

If desired, the aryl sulfonyl morpholine may be used in conjunction with known plasticizers for cellulose derivatives, for example camphor, triacetine, dibutyl phthalate, triphenyl phosphate, tricresyl phosphate, dilauryl phthalate, esters of ortho-benzoyl benzoic acid, cyclohexyl butyl phthalate, dicyclohexyl adipate, etc. Also, if desired, known moisture-proofing agents may be suitably incorporated into the compositions, e. g., waxes or wax-like materials such as certain chlorinated hydrocarbons, also paraffin, petrolatum, palm wax, Japan wax, beeswax, ceresin, carnauba wax, candelilla wax, etc. Resinous or non-resinous modifying bodies or blending agents also may be incorporated into the compositions, e. g., dammar, copal, kauri, rosinates, hydrogenated rosin, hydrogenated rosin esters, ester gums, alkyd resins, including those produced by reaction of ingredients comprising a polyhydric alcohol and a saturated or unsaturated polycarboxylic acid, oil-soluble phenol-formaldehyde resins, vinyl compounds, solid chlorinated diphenyl compounds, methyl abietate, ethyl abietate, polyhydric alcohol rosinates (e. g., ethylene glycol rosinate, diethylene glycol hydrorosinate, etc.), castor oil, hydrogenated castor oil, etc. Pigments, dyes, opacifiers, mold lubricants, inert fillers and other effect agents may be added as desired or as conditions may require.

These new compositions of matter comprising a cellulose derivative and an aryl sulfonyl morpholine have a wide variety of uses. For example, articles of manufacture comprising a base coated with a composition comprising a cellulose derivative and an aryl sulfonyl morpholine may be produced in accordance with this invention. Thus, valuable wrapping tissues may be obtained by coating a base sheet formed of a transparent, non-fibrous material with a transparent composition comprising a cellulose derivative and an aryl sulfonyl morpholine. Examples of base sheet material which advantageously may be coated with these new compositions are paper, cellulosic materials, films made from rubber derivatives, for instance rubber hydrochloride, chlorinated rubber, reaction products of rubber and a metal halide, etc. These new compositions also may be molded into a variety of shapes under heat and pressure to form valuable decorative and commercially useful molded articles. They also may be employed as electrically insulating materials, e. g., as coatings for wire or the like, and in the production of surface protective materials such as lacquers, enamels, etc., and for other purposes.

What I claim as new and desire to secure by Letters Patent of the United States is:

1. A composition of matter comprising (1) a cellulose derivative selected from the group consisting of cellulose esters, cellulose ethers and cellulose ether-esters and (2) an aryl sulfonyl morpholine.

2. A composition of matter comprising a cellulose ester and an aryl sulfonyl morpholine.

3. A composition of matter comprising a cellulose ether and an aryl sulfonyl morpholine.

4. A composition of matter comprising a cellulose ether-ester and an aryl sulfonyl morpholine.

5. A composition of matter comprising (1) a cellulose derivative selected from the group consisting of cellulose esters, cellulose ethers and cellulose ether-esters and (2) benzene sulfonyl morpholine.

6. A composition of matter comprising (1) a cellulose derivative selected from the group consisting of cellulose esters, cellulose ethers and cellulose ether-esters and (2) para-toluene sulfonyl morpholine.

7. A composition of matter comprising cellulose acetate and benzene sulfonyl morpholine in an amount corresponding to from 5 to 100 parts by weight of the said morpholine for each 100 parts by weight of cellulose acetate.

8. A composition of matter comprising ethyl cellulose-acetate and benzene sulfonyl morpholine in an amount corresponding to from 5 to 100 parts by weight of the said morpholine for each 100 parts by weight of ethyl cellulose-acetate.

9. A composition of matter comprising cellulose acetate and para-toluene sulfonyl morpholine in an amount corresponding to from 5 to 100 parts by weight of the said morpholine for each 100 parts by weight of cellulose acetate.

10. A composition of matter comprising ethyl cellulose-acetate and para-toluene sulfonyl morpholine in an amount corresponding to from 5 to 100 parts by weight of the said morpholine for each 100 parts by weight of ethyl cellulose-acetate.

11. An article of manufacture comprising a base coated with a composition comprising (1) a cellulose derivative selected from the group consisting of cellulose esters, cellulose ethers and cellulose ether-esters and (2) an aryl sulfonyl morpholine.

12. An article of manufacture comprising a base sheet formed of a transparent, non-fibrous material, said sheet being coated with a transparent composition comprising (1) a cellulose derivative selected from the group consisting of cellulose esters, cellulose ethers and cellulose ether-esters and (2) an aryl sulfonyl morpholine.

13. A product comprising a molded composition comprising a cellulose ester and an aryl sulfonyl morpholine in an amount corresponding to from 5 to 40 parts by weight of the said morpholine for each 100 parts by weight of the cellulose ester.

14. Sheet wrapping material formed of a composition comprising (1) a cellulose derivative selected from the group consisting of cellulose esters, cellulose ethers and cellulose ether-esters and (2) an aryl sulfonyl morpholine in an amount corresponding to from 5 to 100 parts by weight of the said morpholine for each 100 parts by weight of the said cellulose derivative.

GAETANO F. D'ALELIO.